United States Patent
Forest et al.

(10) Patent No.: US 11,725,100 B2
(45) Date of Patent: Aug. 15, 2023

(54) PROPLYLENE-BASED COPOLYMER PRODUCT

(71) Applicant: Braskem S.A., Camaçari (BR)

(72) Inventors: Tadeu Mezacasa Forest, São Paulo (BR); Gustavo Gori Lusa, São Paulo (BR)

(73) Assignee: Braskem S.A., Camaçari (BR)

( * ) Notice: Subject to any disclaimer, the term of this patent is extended or adjusted under 35 U.S.C. 154(b) by 358 days.

(21) Appl. No.: 15/931,296

(22) Filed: May 13, 2020

(65) Prior Publication Data
US 2020/0362150 A1 Nov. 19, 2020

Related U.S. Application Data

(60) Provisional application No. 62/847,097, filed on May 13, 2019.

(51) Int. Cl.
| C08L 23/12 | (2006.01) |
| C08F 2/34 | (2006.01) |

(Continued)

(52) U.S. Cl.
CPC .............. *C08L 23/12* (2013.01); *C08F 2/34* (2013.01); *C08F 210/02* (2013.01);
(Continued)

(58) Field of Classification Search
CPC .... C08L 2207/02; C08L 23/12; C08L 23/142; C08L 23/16
See application file for complete search history.

(56) References Cited

U.S. PATENT DOCUMENTS

| 2012/0157599 A1 | 6/2012 | Doufas et al. |
| 2013/0095542 A1 | 4/2013 | Pereira et al. |
| 2017/0267794 A1 | 9/2017 | Lin et al. |

FOREIGN PATENT DOCUMENTS

| EP | 1661935 A1 | 5/2006 |
| EP | 2294128 A1 | 3/2011 |

(Continued)

OTHER PUBLICATIONS

International Search Report issued in corresponding International Application No. PCT/IB2020/020021; dated Jul. 17, 2020 (6 pages).

(Continued)

*Primary Examiner* — Mark S Kaucher
(74) *Attorney, Agent, or Firm* — Osha Bergman Watanabe & Burton LLP

(57) ABSTRACT

Heterophasic polypropylene copolymer compositions and methods of making the same include a matrix phase of a random polypropylene-based copolymer; and an elastomeric rubber phase dispersed in the matrix phase, wherein the elastomeric rubber phase includes propylene and one or more comonomers and has a viscosity index ratio, relative to a viscosity index of the random polypropylene-based copolymer, that ranges from 0.3 to 1.1; and wherein an average particle size of the dispersed elastomeric rubber phase is less than 300 nm. Methods include dispersing an elastomeric rubber phase that includes propylene and one or more comonomers into a matrix phase of a random polypropylene-based copolymer, wherein the elastomeric rubber phase has a viscosity index ratio, relative to a viscosity index of the random polypropylene-based copolymer that ranges from 0.3 to 1.1.

17 Claims, 2 Drawing Sheets

(51) Int. Cl.
*C08F 210/02* (2006.01)
*C08F 210/08* (2006.01)

(52) U.S. Cl.
CPC ........ *C08F 210/08* (2013.01); *C08F 2800/10* (2013.01); *C08L 2205/02* (2013.01); *C08L 2205/22* (2013.01); *C08L 2207/02* (2013.01)

(56) References Cited

FOREIGN PATENT DOCUMENTS

| KR | 101846716 B1 | * | 5/2018 | |
|----|---|---|---|---|
| KR | 101846716 B1 | | 5/2018 | |
| WO | WO-2004055101 A1 | * | 7/2004 | ............... B29D 7/01 |
| WO | WO-2006119901 A1 | * | 11/2006 | ............. B29C 41/24 |
| WO | 2009145645 A1 | | 12/2009 | |

OTHER PUBLICATIONS

Written Opinion of the International Searching Authority issued in corresponding International Application No. PCT/IB2020/020021; dated Jul. 17, 2020 (7 pages).

Grein, C. (2019). Multimodal Polypropylenes: The Close Interplay Between Catalysts, Processes and Polymer Design. In: Albunia, A., Prades, F., Jeremic, D. (eds) Multimodal Polymers with Supported Catalysts. Springer, Cham. (37 pages).

Wittmann L-M, Drummer D. Multilayer sheets for thermoforming non thermoformable polymers. Journal of Plastic Film & Sheeting 2022;38(2):225-244. doi:10.1177/87560879211037387. (20 pages).

* cited by examiner

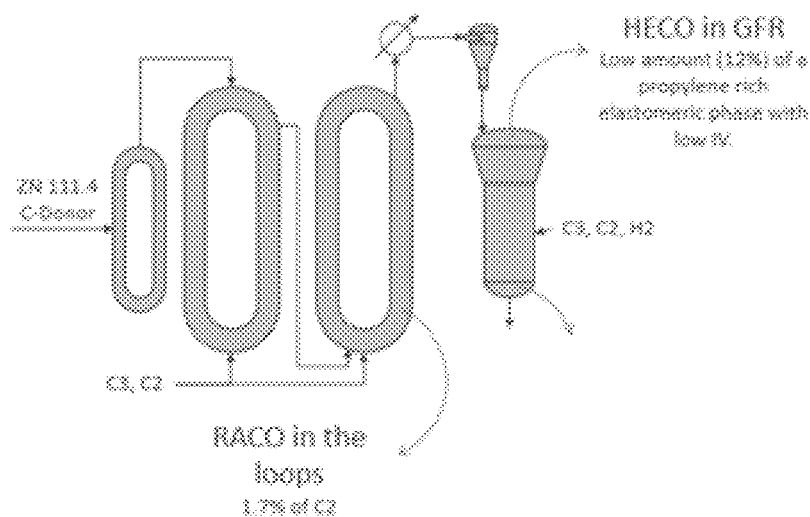
Fig. 1
Fig. 2A
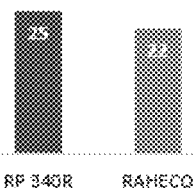
Fig. 2B
Fig. 2C
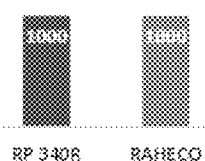
Fig. 2D
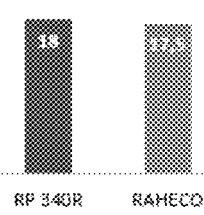
Fig. 2E
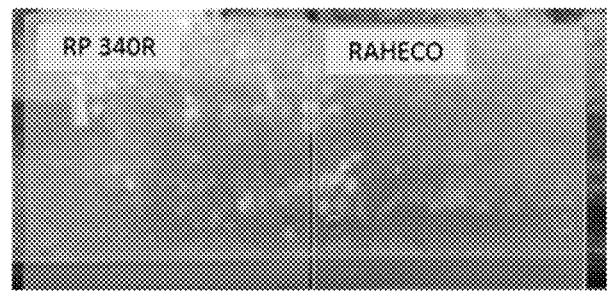

ND COPOLYMER
PROPYLENE-BASED COPOLYMER PRODUCT

BACKGROUND

Polymer compositions are used to produce a varied range of articles for many different applications. Such compositions may be formulated with a variety of components and other additives to provide articles that possess physical properties well suited for their intended use. Propylene polymers are widely used in different areas, such as rigid and flexible packaging, medical applications, and the automotive industry, among others. One of the main applications of this polymer is food packaging. In the food industry, there is an increasing challenge to achieve polypropylene-based products having high stiffness, high impact resistance and desirable optical properties, like transparency.

There are three general types of propylene-based products, which include: homopolymers, random copolymers (RACOs) and heterophasic copolymers (HECOs). Homopolymers are characterized as possessing high stiffness, moderate to poor transparency, and low impact resistance. Whereas random copolymers (namely RACOs) have the best transparency of the three types, they have lower stiffness than homopolymers, and possess moderate impact resistance. Heterophasic copolymers, in turn, have high impact resistance, but they are 100% opaque and show low stiffness.

The transparency of RACOs and homopolymers is due to the absence of particles therein that would interfere with visible light. However, they are fragile and have low impact resistance. Heterophasic copolymers have an elastomeric phase dispersed in a random propylene copolymer matrix. The elastomeric phase can absorb the impact, generating a good impact resistance and ductile product; however, it usually scatters the light, thereby generating a 100% opaque product.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to heterophasic polypropylene-based copolymer compositions that include a matrix phase of a random polypropylene-based copolymer; and an elastomeric rubber phase dispersed in the matrix phase, wherein the elastomeric rubber phase includes propylene and one or more comonomers and has a viscosity index ratio, relative to a viscosity index of the random polypropylene-based copolymer, that ranges from 0.3 to 1.1; and wherein an average particle size of the dispersed elastomeric rubber phase is less than 300 nm.

In another aspect, embodiments disclosed herein relate to methods that include dispersing an elastomeric rubber phase that includes propylene and one or more comonomers into a matrix phase of a random polypropylene-based copolymer, wherein the elastomeric rubber phase has a viscosity index ratio, relative to a viscosity index of the random polypropylene-based copolymer that ranges from 0.3 to 1.1.

In another aspect, embodiments disclosed herein relate to polypropylene polymer compositions that have a haze according to ASTM D1003 measured in 1 mm injected mold plaques, that is less than 30%; an IZOD impact energy according to ASTM D256A at 23° C. greater than 125 J/m; and a flexural modulus secant at—1% according to ASTM D790 of greater than 800 MPa.

Other aspects and advantages of the claimed subject matter will be apparent from the following description and the appended claims.

BRIEF DESCRIPTION OF DRAWINGS

FIG. 1 illustrates a system for producing a heterophasic copolymer composition according to the present disclosure.

FIGS. 2A-2E compare a heterophasic copolymer composition according to the present disclosure as described above to a comparative random copolymer composition. FIG. 2A shows a comparison of melt flow rate (MFR) between a heterophasic copolymer composition of the present disclosure and a comparative random copolymer composition. FIG. 2B shows a comparison of Izod impact energy between a heterophasic copolymer composition of the present disclosure and a comparative random copolymer composition. FIG. 2C shows a comparison of flexular modulus between a heterophasic copolymer composition of the present disclosure and a comparative random copolymer composition. FIG. 2D shows a comparison of haze in 1 mm thick plaques prepared from a heterophasic copolymer composition of the present disclosure and a comparative random copolymer composition. FIG. 2E shows a visual comparison of haze in plaques prepared from a heterophasic copolymer composition of the present disclosure and a comparative random copolymer composition.

DETAILED DESCRIPTION

Figure 3A:
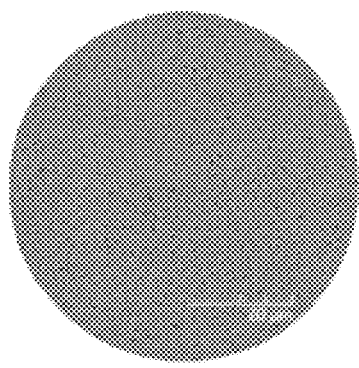
FIGS. 3A-3B show a microscopic view of the improved dispersion of the elastomeric phase achieved by a (FIG. 3A) heterophasic copolymer composition according to the present disclosure, compared to a comparative (FIG. 3B) heterophasic copolymer composition.

One or more embodiments disclosed herein relate to heterophasic polypropylene copolymer compositions having improved optical and mechanical properties including high stiffness and impact resistance. In particular, these properties may be achieved by producing a low viscosity elastomeric rubber phase that is well dispersed in a random polypropylene-based copolymer matrix.

While the mechanical properties of a heterophasic propylene copolymer (HECO) comprising a matrix and elastomeric phase may be tuned by increasing or decreasing the overall amount of the elastomeric rubber phase, generally, this negatively impairs the optical properties due to disparities between the density of the matrix and the elastomeric phases. However, the present invention surprisingly found that an elastomeric phase comprising an ethylene-propylene rubber dispersed in a random polypropylene copolymer matrix and having a particle size lower than % of the wavelength of visible light will not scatter light. Additionally, the low ethylene content in the elastomeric phase further provides for improved dispersion of the elastomeric phase in the matrix, thus providing a clear and transparent product. Consequently, the present compositions result in both excellent optical and mechanical properties.

As mentioned, one or more embodiments may yield the superior optical and mechanical properties by dispersing a low viscosity elastomeric rubber phase in a random polypropylene-based copolymer matrix, i.e., a combination of random copolymer (RACO) and heterophasic copolymer (HECO), which may be referred to as a "RAHECO." The elastomeric rubber phase may include polypropylene and one or more comonomers, and have a relatively low viscosity index, which may result in an average particle size of the dispersed elastomeric rubber phase that is less than 300 nm.

The heterophasic polypropylene-based copolymer composition in accordance with the present disclosure that may also be referred to as a RAHECO contains a matrix phase (continuous phase) of a random polypropylene copolymer and an elastomeric rubber phase (also known as an internal rubber or discontinuous phase). RAHECOs are prepared by incorporating an elastomeric rubber phase into a matrix polymer, which results in a polymer composition having modified bulk properties, including noticeable changes in optical and mechanical properties. For example, RAHECOs prepared in accordance with one or more embodiments of the present disclosure may have a low ethylene content in the elastomeric phase that may provide for improved dispersion of the elastomeric phase in the random polypropylene-based copolymer matrix, thus providing a clear and transparent product.

Compositions

Embodiments of the present disclosure are directed to heterophasic polypropylene-based copolymer compositions (RAHECO) that comprise a random polypropylene-based matrix copolymer and an elastomeric rubber phase, where the elastomeric phase is dispersed in the matrix copolymer.

Matrix Polymer

The matrix phase (or matrix polymer) of the heterophasic polypropylene copolymer composition may comprise a random polypropylene-based copolymer. The random polypropylene-based copolymer may contain one or more comonomers in an amount, for example, ranging from about 0.5 to 5.0 wt. %, relative to the total weight of the random polypropylene copolymer. In one or more embodiments, the matrix copolymer may comprise one or more of the comonomers in an amount ranging from a lower limit of any of 0.5, 1.0, 1.5 or 2.0 wt. % to an upper limit of any of 2.0, 2.5, 3.0, 4.0, or 4.5 wt. %, where any lower limit can be used in combination with any upper limit.

In one or more embodiments, the comonomers of the matrix polymer may be selected from ethylene, butene, and higher α-olefins. In particular embodiments, the comonomers may be selected from the group consisting of ethylene and butene. In one or more embodiments, the comonomer of the matrix polymer is ethylene.

In one or more embodiments, RAHECO compositions may comprise the random polypropylene-based matrix copolymer in an amount ranging from 70 to 90% by weight (wt %), relative to the weight of the total composition. The random polypropylene-based matrix copolymer may be present in an amount ranging from a lower limit of any of 70, 75, or 85 wt % to an upper limit of any of 88, 89, or 90 wt % where any lower amount can be used in combination with any upper limit.

In one or more embodiments, the random polypropylene copolymer forming the matrix phase may have a melt flow rate (MFR) measured according to ASTM D1238 at 230° C./2.16 kg in a range having a lower limit selected from any of 10 g/10 min, 15 g/10 min, 18 g/10 min, and 19 g/10 min, to an upper limit selected from any of 21 g/10 min, 22 g/10 min, 25 g/10 min, and 30 g/10 min where any lower limit may be paired with any upper limit.

In one or more embodiments, the random polypropylene copolymer may have an intrinsic viscosity (IV) as determined by ASTM D445 in decaline at 135° C. in a range having a lower limit selected from any one of 0.5 dL/g, 1.0 dL/g, and 1.7 dL/g, to an upper limit selected from any one of 2.1 dL/g, 2.3 dL/g, 3.0 dL/g, and 3.5 dL/g, where any lower limit may be combined with any upper limit.

Elastomeric Rubber Phase

The dispersed phase of the heterophasic propylene copolymer compositions may be, for example, an elastomeric copolymer and thus may be referred to as an elastomeric rubber phase. The elastomeric copolymer may be a propylene copolymer that comprises propylene and one or more comonomers. In one or more embodiments, the comonomers of the elastomeric copolymer may be one or more selected from a group consisting of ethylene, butene, and higher α-olefins. In particular embodiments, the comonomers may be selected from the group consisting of ethylene and butene. In one or more embodiments, the comonomer of the elastomeric rubber phase is ethylene.

The elastomeric copolymer may comprise the one or more comonomers in an amount ranging from 20 to 50 wt. %, relative to the weight of the elastomeric copolymer. In some embodiments, the elastomeric copolymer may comprise the one or more comonomers in an amount ranging from a lower limit of any of 20, 25, 30, or 33 wt. % to an upper limit of any of 37, 40, 45, or 50 wt. %, where any lower limit can be used with any upper limit.

In one or more embodiments, the dispersed elastomeric rubber phase may have an average particle size that is less than 300 nm. In another embodiment, the dispersed elastomeric rubber phase may have an average particle size that is preferably less than 150 nm. In one or more embodiments the, the dispersed elastomeric rubber phase may an average particle size that ranges from a lower limit consisting of any of 1 nm, 10 nm, 20 nm, 50 nm, and 75 nm to an upper limit of any of 50 nm, 75 nm, 85 nm, 100 nm, 150 nm, and 300 nm, where any lower limit can be used in combination with any upper limit.

In some embodiments, the RAHECO compositions may comprise the elastomeric rubber phase in an amount ranging from 10 to 30 wt. %. In further embodiments, the elastomeric phase may be present in an amount ranging from a lower limit of any of 10, 12, or 13 wt % to an upper limit of any of 15, 20, or 30 wt % where any lower amount can be used in combination with any upper limit.

In one or more embodiments, the elastomeric rubber phase may have a melt flow rate (MFR) measured according to ASTM D1238, at 230° C./2.16 kg in a range having a lower limit selected from any of 10 g/10 min, 15 g/10 min, 18 g/10 min, and 19 g/10 min, to an upper limit selected from any of 21 g/10 min, 22 g/10 min, 25 g/10 min, and 30 g/10 min where any lower limit may be paired with any upper limit.

In one or more embodiments, the elastomeric rubber phase may have an intrinsic viscosity (IV) as determined by ASTM D445 in decaline at 135° C. in a range having a lower limit selected from any one of 0.1 dL/g, 0.3 dL/g, 0.6 dL/g, and 0.8 dL/g, to an upper limit selected from any one of 1.2 dL/g, 1.5 dL/g, and 2.0 dL/g, where any lower limit may be combined with any upper limit.

In one or more embodiments, the viscosity index ratio, as determined by the ratio of the viscosity of the elastomeric rubber phase relative the viscosity of the random copolymer matrix phase, may range from a lower limit selected from any one of, 0.3, 0.4, and 0.5, to an upper limit selected from any one of 0.6, 0.7, 0.9 and 1.1 where any lower limit may be combined with any upper limit.

In one or more embodiments, RAHECO compositions in accordance with the present disclosure may have a total comonomer content ranging from about 1 to 8 wt. %, as determined by FTIR spectroscopy, relative to the total weight of the composition. In particular embodiments, RAHECO compositions may have a total comonomer composition ranging from a lower limit of any of 1, 2, 3, or 4 wt. % to an upper limit of any of 5, 6, 7, or 8 wt. %, where any lower limit can be used with any upper limit.

In one or more embodiments, RAHECO copolymer compositions may include biobased and recycled polypropylene produced from propylene monomers, including polypropylene of varying molecular weight and density, and blends and mixtures thereof. Polypropylenes and copolymers in accordance with the present disclosure may include polyolefins containing a weight percentage of biologically derived monomers. Propylene monomers may be derived from similar biological processes as discussed, for example, in U.S. Pat. Pub. 2013/0095542. In one or more embodiments, biologically derived n-propanol may be dehydrated to yield propylene, which is then polymerized to produce various types of polypropylene. In one or more embodiments, biobased products obtained from natural materials may be certified as to their renewable carbon content, according to the methodology described in the technical standard ASTM D 6866-06, "Standard Test Methods for Determining the Biobased Content of Natural Range Materials Using Radiocarbon and Isotope Ratio Mass Spectrometry Analysis."

RAHECO compositions in accordance with the present disclosure may optionally further comprise one or more additives that modify various physical and/or chemical properties of the composition. Such additives may be selected from, for example, antioxidants, pigments, fillers, reinforcements, adhesion-promoting agents, biocides, whitening agents, nucleating agents, anti-statics, anti-blocking agents, processing aids, flame-retardants, plasticizers, and light stabilizers, and combinations thereof. One of ordinary skill in the art will appreciate, with the benefit of this disclosure, that the choice of additive may be dependent upon the intended use of the composition and/or articles produced therefrom. It will also be appreciated that such additives are not limited to those described above.

In one or more particular embodiments of the present invention, RAHECO compositions may be prepared with nucleating agents or clarifiers including sorbitol acetals such as bis-dialkylbenzylidene sorbitol acetals including 1,3:2,4-bis(3,4-Dimethylbenzylidene)sorbitol or DMDBS and those commercially available as Millad 3988i®, Euroclear 398 High Flow, and Geniset® DXR.

In one or more particular embodiments, RAHECO compositions may be prepared with other additives including a primary phenolic antioxidant such as AO-1010 (Tetrakis [methylene-3(3', 5'-di-tert-butyl-4'-hydroxyphenyl) propionate] methane), a secondary phosphorous antioxidant such as AO-168 (Tris (2,4-di-tert-butylphenyl) phosphite), an acid scavenger such as calcium stearate, among others.

Properties of Compositions

RAHECO compositions according to the present disclosure will generally possess physical properties suitable for the intended use of the composition and the films and/or articles produced therefrom. One of ordinary skill in the art will, with the benefit of this present disclosure, appreciate that altering the relative amounts and/or identities of the components of a copolymer composition may influence the resulting properties of the composition to achieve the desired results for the particular application intended. However, as described above, the compositions of the present disclosure may advantageously have superior optical and mechanical properties that are generally achieved singularly (at the expense of the other).

In one or more embodiments, RAHECO compositions may have an Izod impact energy according to ASTM D256A at 23° C. that is equal to or greater than 120 J/m. In one or more embodiments, RAHECO compositions may have an Izod impact energy according to ASTM D256A at 23° C. that is equal to or greater than 100, 115, 120, 150, or 250 J/m.

In one or more embodiments, RAHECO compositions may have a fraction of xylene solubles according to ASTM D5492 in a range having a lower limit selected from any of 5%, 10%, and 13%, to an upper limit selected from any of 15%, 18%, and 25%, where any lower limit may be paired with any upper limit.

In one or more embodiments, RAHECO compositions may have a fraction of xylene insolubles according to ASTM D5492 in a range having a lower limit selected from any of 75%, 82%, and 85%, to an upper limit selected from any of 87%, 90%, and 95%, where any lower limit may be paired with any upper limit.

In one or more embodiments, the RAHECO composition may have a melt flow rate (MFR) measured according to ASTM D1238, at 230° C./2.16 kg in a range having a lower limit selected from any of 10 g/10 min, 15 g/10 min, and 17 g/10 min, to an upper limit selected from any of 19 g/10 min, 20 g/10 min, 25 g/10 min, and 30 g/10 min where any lower limit may be paired with any upper limit.

In one or more embodiments, RAHECO compositions may have a flexural modulus secant at—1% determined according to ASTM D790 equal to or greater than 800 MPa, 900 MPa, or 1000 MPa. In particular embodiments, ICP compositions may have may have a flexural modulus secant at—1% determined according to ASTM D790 that ranges from a lower limit selected from any one of 800 MPa, 900 MPa, and 1000 MPa, to an upper limit selected from any one of 1100 MPa, 1200 MPa, and 1300 MPa, where any lower limit may be paired with any upper limit.

In one or more embodiments, the RAHECO composition may have a haze according to ASTM D1003 measured on 1 mm injected mold plaques, that is less than 30%. In another embodiment RAHECO composition may have a haze according to ASTM D1003 measured on 1 mm injected mold plaques, that is less than 24%.

Methods of Preparing Compositions

RAHECO compositions in accordance with the present disclosure may be prepared by any suitable method known in the art. Such heterophasic propylene copolymer composition may be produced either by melt mixing of the polypropylene matrix with the elastomeric copolymer or in-situ by sequential polymerization, e.g., the matrix being produced at least in one slurry reactor and subsequently the elastomeric copolymer being produced at least in one gas phase reactor. In one or more embodiments, the polymerization process may comprise the use of any suitable apparatus or equipment that is known in the art. In some embodiments, the polymerization process may comprise the use of one or more of a continually-stirred tank polymerization reactor, a loop polymerization reactor, a fluidized bed polymerization reactor, a gas phase reactor, and a plug flow polymerization reactor.

In one or more embodiments, RAHECO compositions may be produced by a multistage polymerization that utilizes at least two reactors. At least one reactor, the first in some embodiments, may be a loop-slurry reactor used to produce the random copolymer matrix. Other reactors may be gas phase reactors and may produce the elastomeric rubber phase.

In one or more embodiments, RAHECO compositions in accordance with the present disclosure may be prepared in a sequential polymerization process wherein the propylene-based matrix polymer is prepared first, and the elastomer phase is prepared afterwards. For example, as shown in FIG. 1, a system (and process) for forming the RAHECOs of the present disclosure may use multiple stages. First, random polypropylene copolymers may be formed in a loop reactor. As shown, catalyst and propylene may be first injected into the baby loop reactor, thereby forming prepolymers. The prepolymers may be injected into the loop reactor and random polypropylene copolymers may be produced through bulk polymerization. In the gas phase reactor, propylene and ethylene are fluidized and vaporized the elastomeric rubber. In a finishing step (not shown), a steamer may deactivate the catalyst, and pellet type products can be produced through drying and extrusion processes.

Reactors for gas-phase polymerization generally comprise a fluidized bed composed of polymerizing polymer particles that are in the presence of a gas mixture. It is generally advantageous to have a bed in a fluidized state as it provides an extremely high surface area to maximize contact between the bed and the gas mixture. Additionally, the fluidized bed allows for complete mixing of the particulate phase and more frequent impacts between polymer particles and between the polymer particles and the reactor wall. In one or more embodiments, improved dispersion of the elastomeric phase in the matrix may be achieved by obtaining i) a low viscosity of the elastomeric rubber phase, i.e., a high melt flow of the rubber, which may be achieved with the addition of high amount of hydrogen relative to the rubber. In accordance with one or more embodiments, a high hydrogen to elastomeric rubber phase molar ratio in the gas phase reactor may range from a lower limit selected from any one of, 0.45, 0.5, 0.53 to an upper limit selected from any one of 0.57, 0.6, and 0.65, where any lower limit may be combined with any upper limit.

Any suitable catalyst may be used in the preparation of the RAHECO compositions of the present disclosure. In one or more embodiments, RAHECO compositions may be prepared with a catalyst such as Ziegler-Natta, metallocene, or chromium catalysts. In particular embodiments, RAHECO compositions in accordance with the present disclosure may be prepared using a Ziegler-Natta catalyst. Examples of the Ziegler-Natta catalysts that may be utilized include, but are not limited to, one or more phthalate-based catalysts, diether-based catalysts, succinate-based catalysts, and combinations thereof. Particular embodiments of the present disclosure utilize Ziegler-Natta catalytic systems that are not phthalate-based.

Films and Articles

As will be apparent to one of ordinary skill in the art having the benefit of the present disclosure, articles may be formed from any of the aforementioned RAHECO compositions. In one or more embodiments, polymer compositions of the current disclosure can be used in various article manufacturing processes, including compression molding, injection molding, and the like, to produce manufactured articles. The articles of one or more embodiments may be used for packaging applications.

As will be apparent to one of ordinary skill in the art having the benefit of the present disclosure, films may be formed from any of the above-mentioned RAHECO compositions. The films may have a monolayer or a multilayer structure and may be produced by any suitable manufacturing process. In one or more embodiments, films in accordance with the present disclosure may be produced by either extrusion molding, coextrusion molding, extrusion coating, injection molding, cast film extrusion, blown film extrusion, foaming, extrusion blow-molding, injection stretched blow-molding, rotomolding, pultrusion, calendering, additive manufacturing, and lamination.

Articles in accordance with the present disclosure may be produced by laminating one or more of the above-mentioned films with one or more other film layers and/or one or more substrates. The properties of the articles formed according to one or more embodiments of the present disclosure will generally be suitable for the articles intended use. One of ordinary skill in the art, with the benefit of this present disclosure, may appreciate that altering the relative amounts and/or identities of the components of a polymer composition will influence the properties of an article formed therefrom.

EXAMPLES

In the following example, a RAHECO copolymer composition is prepared in accordance with one or more embodiments of the present disclosure.

The RAHECO described as follows is a combination of random propylene copolymer having an ethylene content equal to 1.7% produced in Loop Reactors and a heterophasic copolymer produced in a gas phase reactor, the heterophasic copolymer having an amount of 13% of a propylene-rich elastomeric phase with low viscosity index. In particular, the RAHECO was formed using the system illustrated in FIG. 1, using SPHERIPOL® technology (from Lyondell Basell).

The final product, prepared in accordance with one or more embodiments of the present disclosure, presents excellent optical properties, i.e., haze in 1 mm thickness plaque around 20%, as well as excellent mechanic properties, i.e., MFR at 230°/2.16 Kg around 18 g/min, flexural modulus at 1% sec around 1100 MPa and IZOD impact energy of 120 J/M at room temperature.

FIG. 2 compares the RAHECO product as described above to a standard RACO, referred as RP 340R. It is demonstrated that the final product presents similar optical properties to RP 340R, as shown in FIGS. 2D and 2E. FIGS. 2A and 2C also show that the final products possess similar mechanical properties, such as MFR and flexural modulus, in comparison with standard RACO. However, the RAHECO composition demonstrates much more impact energy (around 350% higher impact energy), as shown in FIG. 2B.

The table below shows a comparison between the RAHECO according to the present disclosure and a standard RACO and HECO.

|  |  | HECO-1 | RACO-1 | RAHECO-1 | RAHECO-2 |
| --- | --- | --- | --- | --- | --- |
| MFR | g/10 min | 25.0 | 20.0 | 18.0 | 18.9 |
| Ethylene Content | % | 11.2 | 3.3 | 4.4 | 4.2 |
| Xylene Soluble |  | 20.5 | 6.5 | 13.4 | 13.6 |

-continued

|  |  | HECO-1 | RACO-1 | RAHECO-1 | RAHECO-2 |
|---|---|---|---|---|---|
| Ethylene in rubber Phase | % | 35 | Doesn't have rubber phase | 30 | 30 |
| Viscosity Index Ratio (Rubber Viscosity/ Matrix Viscosity) | — | 1.8 (1.6-2.2) | Doesn't have rubber phase | 0.5 (0.3-1.1) | 0.42 (0.3-1.1) |
| Impact Energy IZOD @23° C. | J/m | 130 | 40 | 120 | 245 |
| Flexural Modulus | MPa | 1150 | 1000 | 1100 | 1050 |
| Haze 1.27 mm | % | 100% opaque | 20 | 20.8 | 23.8 |

Figure 3B:
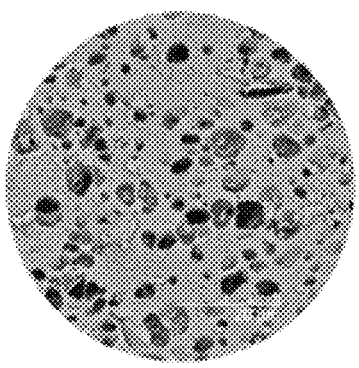

As it can be noted from the table above, the RAHECO composition prepared in accordance with one or more embodiments of the present disclosure is demonstrated as having a lower viscosity index of the elastomeric phase, measured by the viscosity index ratio. Such lower viscosity ratio, as well as the small particle size of the elastomeric phase, preferably smaller than 300 nm, allows a good dispersion in the matrix. FIG. 3A further shows a microscopic view of the improved dispersion of the elastomeric phase achieved by the RAHECO of present disclosure, compared to a common heterophasic copolymer (HECO) shown in FIG. 3B. The elastomeric phase still has the effect of absorbing energy, thus providing impact resistance to the desired product, and it will not scatter light as standard heterophasic copolymers. Both the average particle size and dispersion of the elastomeric rubber phase are improved in the image of the RAHECO sample. Therefore, the lower viscosity index and the smaller particle size of the rubber generate a more dispersed elastomeric phase in the matrix, thus producing a clear tough product with good impact resistance and stiffness.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A heterophasic polypropylene-based copolymer composition comprising:
   a matrix phase of a random polypropylene-based copolymer; and
   an elastomeric rubber phase dispersed in the matrix phase, the elastomeric rubber phase comprising propylene and a comonomer and having a viscosity index ratio ranging from 0.3 to 1.1, wherein the viscosity index ratio is the ratio of the intrinsic viscosity (IV) of the elastomeric rubber phase relative to the intrinsic viscosity (IV) of the matrix phase, wherein each intrinsic viscosity is measured according to ASTM D445 in decaline at 135° C.;
   wherein an average particle size of the dispersed elastomeric rubber phase is less than 300 nm,
   wherein the comonomer of the elastomeric rubber phase is ethylene and is present in an amount ranging from 20 to 37 wt % relative to the weight of the elastomeric rubber phase,
   and wherein the polymer composition has a melt flow rate (MFR) according to ASTM D1238 at 230° C./2.16 kg, ranging from 10 g/10 min to 25 g/10 min.

2. The composition of claim 1, wherein the random polypropylene-based copolymer comprises one or more comonomers in an amount ranging from 1.0 to 2.5 wt % based on the matrix phase.

3. The composition of claim 1, wherein the elastomeric rubber phase is present in an amount ranging from about 10 to 30 wt % relative to the weight of the composition.

4. The composition of claim 1, wherein the composition has a total comonomer content ranging from 3 to 7 wt % based on the total weight of the composition.

5. The composition of claim 1, wherein the composition has an IZOD impact energy according to ASTM D256A at 23° C. greater than 125 J/m.

6. The composition of claim 1, wherein the polymer composition exhibits a flexural modulus secant at—1% according to ASTM D790 of greater than 800 MPa.

7. The composition of claim 1, wherein the matrix phase has an intrinsic viscosity (IV), measured according to ASTM D445, in decaline at 135° C., that ranges from 1 dL/g and 3 dL/g.

8. The composition of claim 1, wherein the elastomeric rubber phase has an intrinsic viscosity (IV), measured according to ASTM D445, in decaline at 135° C., that ranges from 0.1 dL/g and 2 dL/g.

9. The polymer composition of claim 1, wherein the viscosity index ratio ranges from about 0.5 to 0.9.

10. The polymer composition of claim 1, wherein the copolymer composition has a haze according to ASTM D1003 measured in 1 mm injected mold plaques, that is less than 30%.

11. An article comprising the polymer composition according to claim 1.

12. A method for preparing the heterophasic polypropylene-based copolymer composition of claim 1, comprising: dispersing an elastomeric rubber phase comprising propylene and one or more comonomers into a matrix phase of a random polypropylene-based copolymer, the elastomeric rubber phase having a viscosity index ratio, relative to a viscosity index of the random polypropylene-based copolymer, ranging from 0.3 to 1.1.

13. The method of claim 12, further comprising: preparing the elastomeric rubber phase and the random polypropylene-based copolymer in at least two reactors.

14. The method of claim 13, further comprising:
polymerizing the random polypropylene-based copolymer in one or more loop reactors; and
polymerizing the elastomeric rubber phase in one or more gas phase reactors.

15. The method of claim 14, wherein the gas phase reactor has a molar ratio of hydrogen gas to elastomeric rubber phase ranging from 0.5 to 0.6.

16. The method of claim 12, wherein the dispersed elastomeric rubber phase has an average particle size of less than 100 nm.

17. The composition of claim 1, wherein the polymer composition has a melt flow rate (MFR) according to ASTM D1238 at 230° C./2.16 kg, ranging from 17 g/10 min to 25 g/10 min.

* * * * *